United States Patent [19]
Suh et al.

[11] Patent Number: 5,823,644
[45] Date of Patent: Oct. 20, 1998

[54] PERSONAL COMPUTER WITH AN EASY ASSEMBLY STRUCTURE

[75] Inventors: Dong-Ki Suh, Suwon; Whan-haeng Jo, Seoul, both of Rep. of Korea

[73] Assignee: SamSung Electronics Co., Ltd., Suwon, Rep. of Korea

[21] Appl. No.: 652,969

[22] Filed: May 24, 1996

[30] Foreign Application Priority Data

Jun. 14, 1995 [KR] Rep. of Korea ................. 15756/1995
Aug. 24, 1995 [KR] Rep. of Korea ................. 22090/1995

[51] Int. Cl.$^6$ ............................................. A47B 81/00
[52] U.S. Cl. ..................... 312/223.2; 361/726; 361/725; 292/124
[58] Field of Search ................. 312/223.2, 265; 361/685, 726, 732, 725; 292/124

[56] References Cited

U.S. PATENT DOCUMENTS

| | | | |
|---|---|---|---|
| 229,995 | 7/1880 | Freeman | 292/124 |
| 1,944,450 | 1/1934 | Myers . | |
| 2,221,095 | 12/1940 | Jacobi . | |
| 2,648,561 | 8/1953 | Landon . | |
| 2,893,773 | 7/1959 | Clifton, Jr. . | |
| 3,703,323 | 11/1972 | Gallas et al. | 312/265 X |
| 4,083,589 | 4/1978 | Palmerino . | |
| 4,833,547 | 5/1989 | Mase | 292/124 X |
| 4,940,414 | 7/1990 | Lee | 439/131 |
| 5,051,868 | 9/1991 | Leverault et al. | 361/685 X |
| 5,164,886 | 11/1992 | Chang | 312/257.1 X |
| 5,213,382 | 5/1993 | Dawdy et al. . | |
| 5,269,598 | 12/1993 | Liu | 312/223.2 |
| 5,321,962 | 6/1994 | Ferchau et al. . | |
| 5,325,263 | 6/1994 | Singer et al. | 361/685 X |
| 5,438,476 | 8/1995 | Steffes | 312/223.2 X |
| 5,446,618 | 8/1995 | Tetsuya | 361/726 X |
| 5,493,099 | 2/1996 | McWilliams, III | 292/124 X |
| 5,508,886 | 4/1996 | Bernecker et al. | 361/725 X |
| 5,510,957 | 4/1996 | Takagi | 361/725 X |
| 5,547,272 | 8/1996 | Patterson | 312/223.2 |
| 5,580,182 | 12/1996 | Lin | 292/228 X |
| 5,587,877 | 12/1996 | Ryan et al. | 312/223.2 X |
| 5,600,538 | 2/1997 | Xanthoploulos | 361/685 X |

FOREIGN PATENT DOCUMENTS

| | | | |
|---|---|---|---|
| 71559 | 2/1983 | European Pat. Off. | 361/732 |
| 453771 | 12/1949 | Italy | 292/124 |
| 403283600 | 12/1991 | Japan | 361/726 |
| 403290994 | 12/1991 | Japan | 361/726 |
| 405257569 | 10/1993 | Japan | 361/726 |
| 126148 | 9/1949 | Sweden | 292/124 |
| 712986 | 1/1980 | U.S.S.R. | 361/726 |

*Primary Examiner*—Peter M. Cuomo
*Assistant Examiner*—David E. Allred
*Attorney, Agent, or Firm*—Robert E. Bushnell, Esq.

[57] ABSTRACT

The present invention is a personal computer case that is easy to assemble and disassemble. The computer case can be separated into two members, the first covering the top, front, right and left sides of the case, and the second covering the bottom, front, and rear sides of the case. A push button operated latch enables one member to become detached from the other member, allowing the case to be opened, without requiring the use of screws or special tools. The push button contains a slidable detent feature that can prevent the button from being depressed, thus preventing the inadvertent disassembly, separation, and opening of the computer case. The case contains a security feature that involves attaching a padlock to a tab portion of one member that is slid through a hole in the other member. With the padlock attached, the tab can not be retracted from the hole, thus preventing the unwanted separation of the two members.

10 Claims, 6 Drawing Sheets

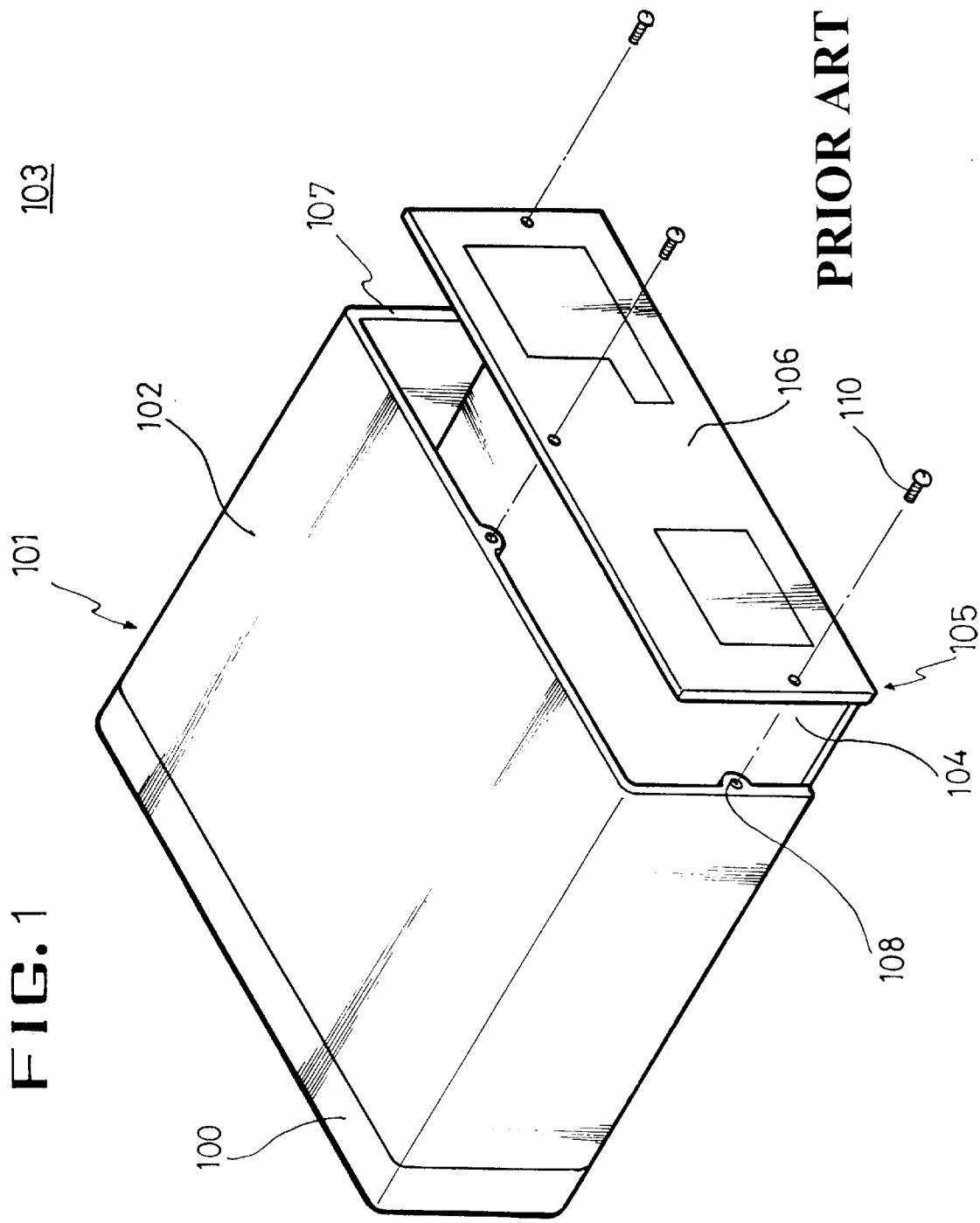

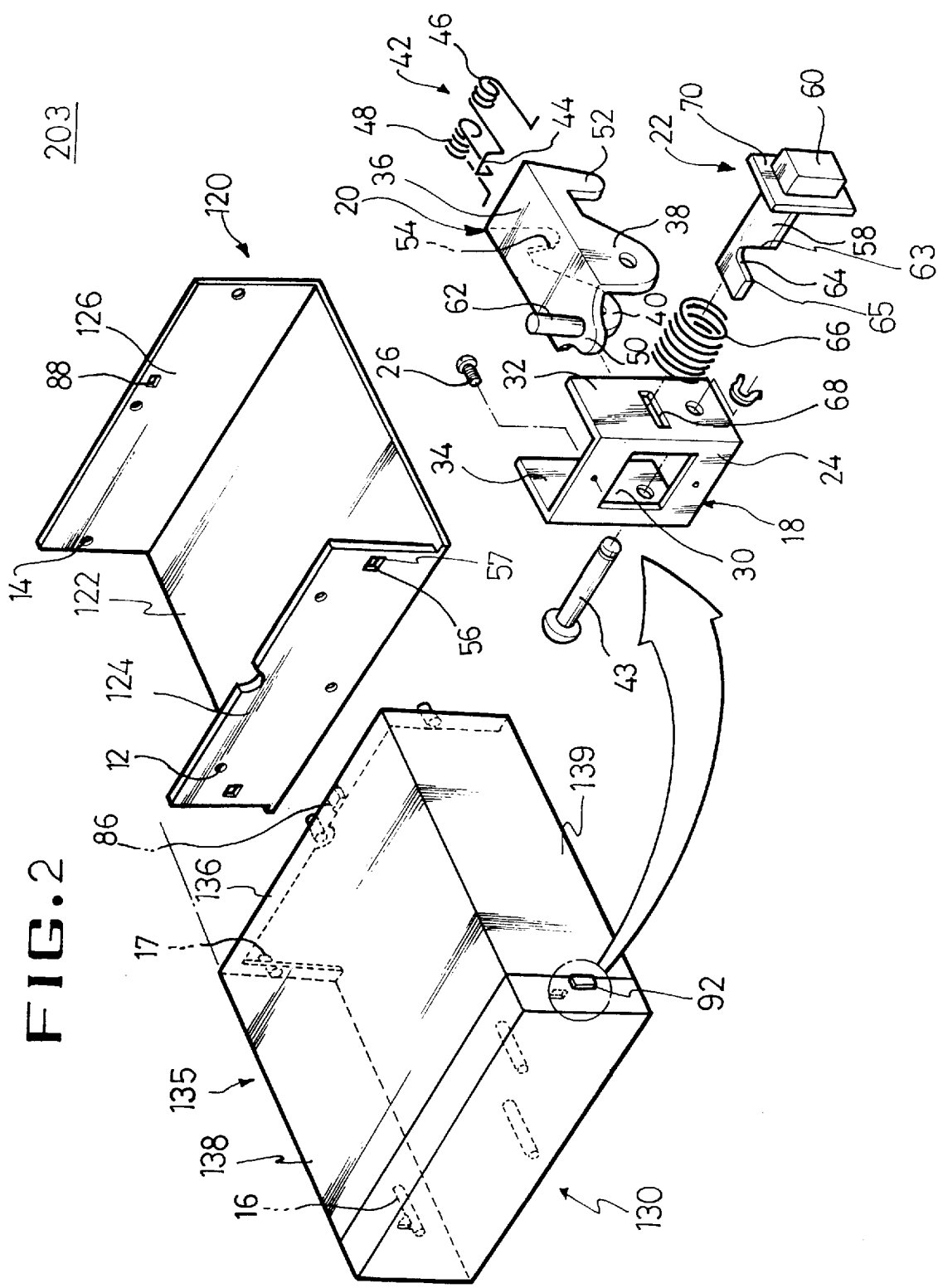

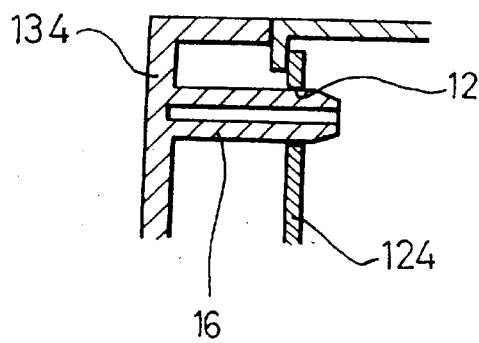
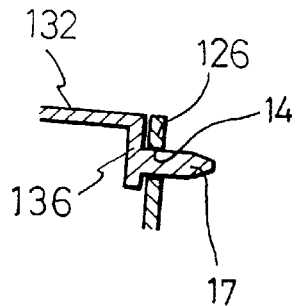
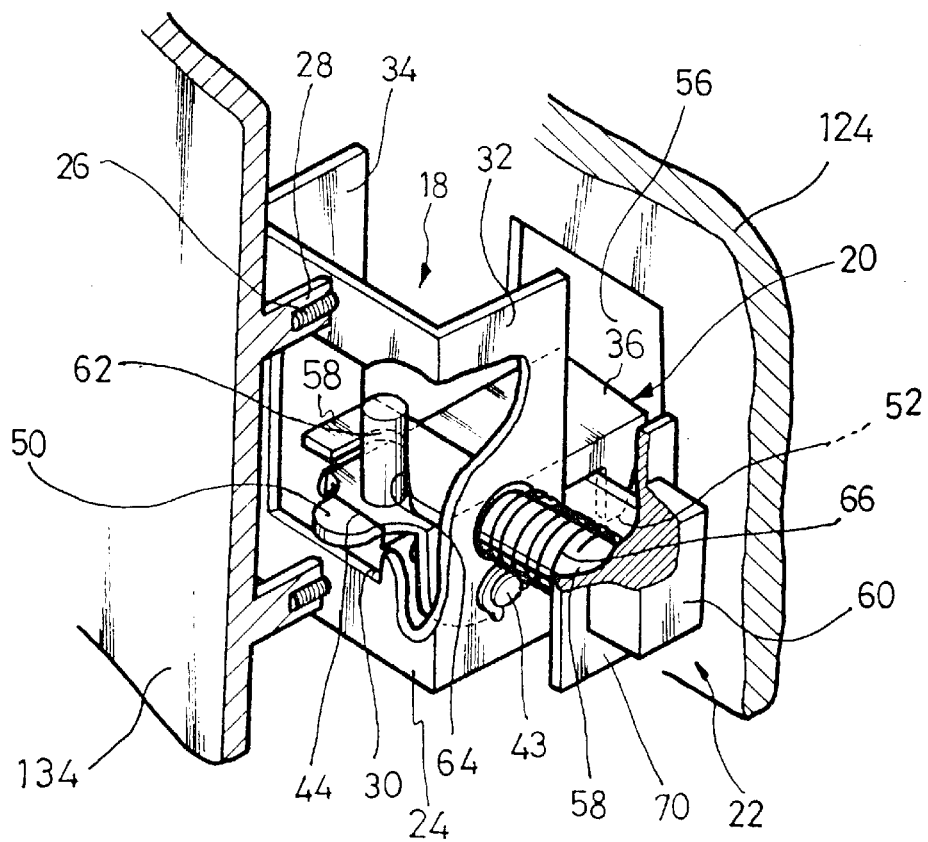

PERSONAL COMPUTER WITH AN EASY ASSEMBLY STRUCTURE

CROSS-REFERENCE TO RELATED APPLICATIONS

This application makes reference to, incorporates the same herein, and claims all benefits accruing under 35 U.S.C. §119 arising from an application for A Personal Computer with an Easy Assembly Structure earlier filed in the Korean Industrial Property Office on the 14 Jun. 1995 and there duly assigned Ser. No. 15756/1995, and a Utility Model Application for Assembly Structure For The Main Case Of The Personal Computer filed in the Korean Industrial Property Office on the 24 of Aug. 1995 and there assigned Ser. No. 22090/1995.

FIELD OF THE INVENTION

The present invention relates to a personal computer, and more particularly to a main body case structure that is easy to assemble and disassemble, so that it becomes easier for a user to manipulate, and simpler for a manufacturer to make.

BACKGROUND OF THE INVENTION

Push button latches have long been incorporated into appliances in a limited field. For example, U.S. Pat. No. 4,083,589 for a Vehicle Security System to Palmerino discloses a vehicle security system where the user pushes a push button to overcome a spring bias. This causes a piece monolithically integrated with the push button to translate in the same direction as the push button. An inclined surface on the monolithic piece of the push button, in contact with a second member, slides the second member by camming action, in a direction perpendicular to the direction of travel of the push button. U.S. Pat. No. 2,648,561 for a Push Button Latch to Landon discloses a similar device as the one depicted in Palmerino. In Landon, a button is pushed, overcoming the resilient force of a spring bias, thus causing a member monolithically integrated to the push button to translate in the same direction as the push button ane thereby causing an inclined plane located on the monolithic push button piece to move in the same direction as the push button. This inclined plane remains in contact with a second member, causing, by camming action, the second member to translate in a direction perpendicular to the first member and against a spring bias on the second member. The translation in the second member caused by the depression of the button on the first member frees a latch monolithically integrated on the second member from an aperture in a chassis part, allowing for the disassembly of the chassis.

In one of the other fields, namely architectural design, U.S. Pat. No. 1,944,450 for a Sash Control for Sliding Windows to Myers describes a window sash control. In Myers, a push button is depressed, causing a monolithically integrated member to cam with a latch bar forcing the latch bar to pivot downward in a direction perpendicular to the push button motion and opposite the spring bias on the latch bar. By forcing the latch bar to pivot downward, a layer of weatherstripping is disengaged. U.S. Pat. No. 2,221,095 for a Door Locking and Latching Mechanism to Jacobi describes a door locking and latching mechanism. In Jacobi, a push button feature is disclosed. When the push button is depressed, the member monolithically integrated with the push button travels in the same direction as the push button. A rotatable latch, in contact with the push button member, is rotated against a spring bias because of the force of the push button member. This rotation of the latch member against spring bias causes a hook, monolithically integrated to the pivotable latch member, to rotate out from an aperture of the structure allowing for the door to open. U.S. Pat. No. 2,893,773 for a Latch and Detent Assembly to Clifton describes a latch with a detent assembly for a door. The detent prevents the unauthorized unlatching of the door.

More recent efforts include U.S. Pat. No. 5,321,962 for an Injector/Ejector Latch Lock Mechanism to Ferchau et al. which illustrates a sliding safety mechanism that prevents the operation of an unlatching mechanism on a computer console. A security lock prevents a trigger from rotating, thereby preventing a handle pivotably mounted on the chassis from unlatching the chassis parts, thus preventing the disassembly of the chassis.

U.S. Pat. No. 5,213,382 for a Locking Mechanism for Refuse Container to Dawdy et al. discloses a locking mechanism where a control bar is pivotably mounted and contains a tab section having an aperture. A locking bar also contains a tab with an aperture. When the control bar is rotated to the latched position, the tabs of the control bar and the locking bar as well as the respective apertures align. A padlock may be inserted through the two holes when aligned, thereby preventing the subsequent unlatching of the container.

I have discovered that button operated latches have not been well developed in the field of enclosures and cases for small computers, principally because of the availability of a less expensive alternatives, such as using threaded fasteners. In the past, it was generally a service technician, rather than an operator, that opened computer cases. As a service technician would work on many computer cases in a single day, the service technician was equipped with specialized equipment to open and close a computer case and to fix the equipment. Today, it is more common for an operator of the computer to be required to open and close a computer case. Since an operator opens a computer case only occasionally, it is much more unlikely that for the operator will possess and use the tools and familiarity necessary to accomplish this task and, due to a lack of familiarity and an absence of manual dexterity, to either drop or cross-thread the threaded fasteners. I have found that the types of fasteners currently used to close cases of small computers actually impede opening and closing of the computer case for a typical operator. Also, I have discovered that these types of contemporary latches tend to be designed to function in conjunction on a particular surface of an enclosure, without regard to the shapes and operational interaction of other structural members of an enclosure. Moreover, many of these latches are designed to be mounted on the exterior of the enclosure, a fact that unnecessarily encumbers the exterior.

SUMMARY OF THE INVENTION

It is therefore an object of the present invention to provide an improved latch for an enclosure.

It is another object to provide a case of a personal computer that facilitates opening and closing of the case while enhancing in the assembly of case during the manufacturing process.

It is yet another object to provide a mechanism for disassembling of a computer case that enables a user to simply depress a button while pulling the cover unit off of the base unit of the chassis for the computer enclosed by the case.

It is still another object to provide a mechanism enabling assembly of a computer case by the expedient of simply sliding together top and bottom members of the case.

It is still yet another object to provide a detent mechanism that prevents the inadvertent disassembly and opening of a computer case by providing a mechanism for preventing a button from being depressed.

It is also an object to provide a security mechanism by providing for the use of a padlock to prevent unauthorized opening and disassembly of a computer case.

It is a further object to provide a latch that may be conveniently integrated with other structural features to assure heightened integrity for the security of closed a container accurate alignment of the structural members of a container while closing the container, and to maintain an case of opening the container as well as convenience of assembly of the latch into the interior of the container during manufacture.

These and other objects may be achieved by a personal computer constructed according to the principles of the present invention with a bottom plate upon which the operational components is of the computer are mounted, and first and second plates erected respectively at front and rear portions of the bottom plate and monolithically integrated into the bottom plate, and a front-upper cover assembly including a front cover portion forming the front side of the computer and an upper cover portion covering upper, left, and right sides of the computer, thus completing the external appearance of the computer. In addition, a push button operated locking mechanism may be fixedly attached to the front upper cover assembly for engaging and disengaging the bottom plate assembly. Pushing the button causes, by camming action, a catching member to rotate, that in turn causes a hook on the catching member to rise from a catching edge of an aperture located on the first plate of the bottom plate assembly. A sliding detent mechanism, which allows a knob, slidably attached to the front upper cover assembly near the button, to slide up to the button, causing a protruding tab on the knob to be inserted into a cavity in the button, prevents the button from being depressed and thus avoids the inadvertent disassembly and opening of the computer case. A security mechanism having a tab, is monolithically integrated into the front upper cover assembly and contains a first aperture for a padlock to lock onto at the extremity of the tab, so that when the tab is slid into a second aperture in the second plate of the bottom plate assembly, a padlock can lock onto the first aperture and prevent the removal of the tab from the second aperture and prevent the inadvertent and unwanted disassembly, separation, and opening of the computer case.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a perspective view of a composite assembly arranged to show representative salient features in a conventional computer case;

FIG. 2 is an exploded perspective view of a computer case assembly constructed in accordance with the principles of the present invention;

FIG. 3A is a sectional view showing a guide pin on the front cover connected to a guide hole of the first plate of the bottom plate assembly in accordance with the principles of the present invention;

FIG. 3B is a sectional view showing a guide pin of the rear flange of the front upper cover assembly connected to a guide hole in the second plate of the bottom plate assembly in accordance with the principles of the present invention;

FIG. 4A is a fragmentary sectional perspective view showing a locking mechanism constructed in accordance with the principles of the present invention;

DETAILED DESCRIPTION OF THE INVENTION

Figure 5:
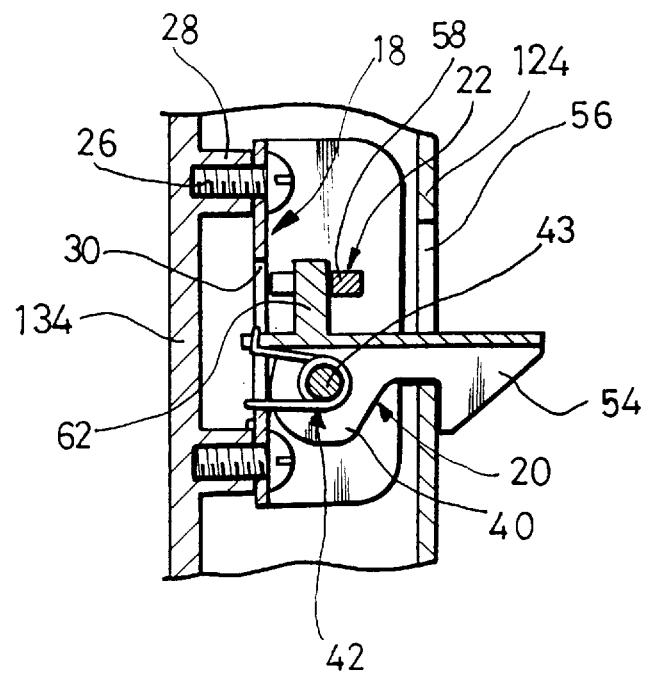
FIG. 5 is a sectional view showing the latched state of the locking mechanism in accordance with the principles of the present invention.

A personal computer generally has a main body that contains a central processing unit, a memory unit, an auxiliary storage device, an input device such as a keyboard, and an output device such as a monitor. The main body completely encapsulates these components. Because the main body is generally not made as one monolithic piece, the case enclosing the main body is formed by the assembly of a plurality of parts. The case that houses the main body of the personal computer may be constructed with a bottom plate on which various of the computer parts are mounted, an upper cover for covering and protecting the computer parts that have been attached to the bottom plate, a front cover enclosing the front of the main body, and side and rear plates.

An abstract representation of several salient features occasionally found in conventional computer cases is shown in FIG. 1. The assembly of the case for the main body is achieved by fixing the front cover 100 to the front part of the upper cover 102 so that they are one body as upper cover assembly 101, and then by combining the upper cover assembly 101 with the bottom plate assembly 105 made up of a bottom plate 104, a rear panel 106, and a front panel (not shown). The combining of upper cover assembly 101 with bottom plate assembly 105 is achieved by screwing rear plate 106, erected from the rear end of the bottom plate assembly 105, into screw holes 108 formed on rear flange 107 of upper cover assembly 101, by means of screws 110. Thus, assembly of a conventional computer case involves screwing together of two monolithic units.

As a result, if a user wants to open the conventional computer case for interior repair or installation of a peripheral circuit board for example, the whole upper cover assembly 101 needs to be removed from bottom plate assembly 105. The drawback of the conventional computer case is that all of the screws need to be loosened, removed and then screwed back in when assembling and disassembling the case. This is an inconvenient process as it is time consuming and creates a high risk of losing screws. In addition, since every screw should be driven one by one while assembling the main body at the manufacturing process, productivity is greatly reduced due to the decrease of assembly line efficiency.

FIG. 2 is an exploded perspective view of computer case 203 assembled according to the principles of the present invention. This embodiment of the present invention achieves complete encapsulation of the computer components by joining together two monolithically integrated parts, bottom plate assembly 120 and front upper cover assembly 130. Unlike the conventional computer case, the present invention does not use screws or tools to assemble or disassemble the computer case.

Bottom plate assembly 120 is a monolithically integrated part that contains bottom plate 122, first plate 124 in the front, and second plate 126 in the rear. The computer components are mounted on bottom plate 122. Front upper cover assembly 130 is a separate monolithically integrated part that contains front cover 134, upper cover 135, left side 138, right side 139, and rear flange 136 extending around the periphery of the rear side. When computer case 203 is assembled, front cover 134 is placed in front of first plate 124, thereby making first plate 124 invisible to an external observer. Meanwhile, rear flange 136 is obscured to an outside observer by second plate 126 when computer case 203 is assembled.

Referring also to FIGS. 3A, 3B and 4, when assembling computer case 203, in order to provide for a snug fit between bottom plate assembly 120 and front upper cover assembly 130, guide pins 16 on front upper cover assembly 130 are positioned to fit inside guide holes 12 in bottom plate assembly 120. During assembly of computer case 203, at least one guide pin 16 of front cover 134 of front upper cover assembly 130 is positioned to slide into corresponding guide hole 12 of first plate 124 of bottom plate assembly 120. See FIG. 3A in conjunction with FIG. 2. Simultaneously, at least one guide pin 17 on rear flange 136 of front upper cover assembly 130 is positioned to slide into corresponding guide hole 14 of second plate 17 of bottom plate assembly 120, as is shown by FIG. 3B in conjunction with FIG. 2. The result is a tight, snug fit between front upper cover assembly 130 and bottom plate assembly 120.

Referring now cumulatively to FIGS. 2 through 7, separately from the guide pins and guide holes already discussed, a locking mechanism for latching front upper cover assembly 130 to bottom plate assembly 120 is provided. Supporting member 18 for supporting pivotable latching member 20 is mounted on either the left or right side 138, 139 of the inside of front cover 134. Button mechanism 22 for operating pivotable latching member 20 is shown in FIG. 4. Supporting member 18 includes plane portion 24 and side walls 32 and 34, and is fixed to bosses 28 projecting from the inside of the front cover 134 by means of threaded screws 26. Rectangular through hole 30 is formed in the central part of plane portion 24 of supporting member 18, to accommodate the insertion of the front portion of pivotable latching member 20. The size of through hole 30 is such that front projecting portion 50 of pivotable latching member 20 can vertically move to some degree.

Pivotable latching member 20 is rotatably fixed to the lower part of supporting member 18 between side walls 32 and 34. Pivotable latching member 20 includes plane portion 36 and side walls 38 and 40. The lower front portion of side walls 38 and 40 of pivotable latching member 20 are hinged to side walls 32 and 34 of supporting member 18 by means of hinge member 43.

Elastic member 42 which upwardly forces the front end portion of pivotable latching member 20 is made up of a coil spring having wound coils 46 and 48 and connecting part 44 between wound coils 46 and 48, as is shown in FIG. 2. Hinge member 43 passes through wound coils 46 and 48 while connecting part 44 is positioned near front projecting portion 50 of pivotable latching member 20. Connecting part 44 elastically supports the upper side of the front projecting portion 50. The free ends of elastic member 42 elastically support plane portion 24 of supporting member 18. Side walls 38 and 40 are upwardly concaved to form hooks 52 and 54 on either side of the rear portion of pivotable latching member 20. Hooks 52 and 54 latch onto edge 57 of aperture 56 in first plate 124 of bottom plate assembly 120.

Figure 6:
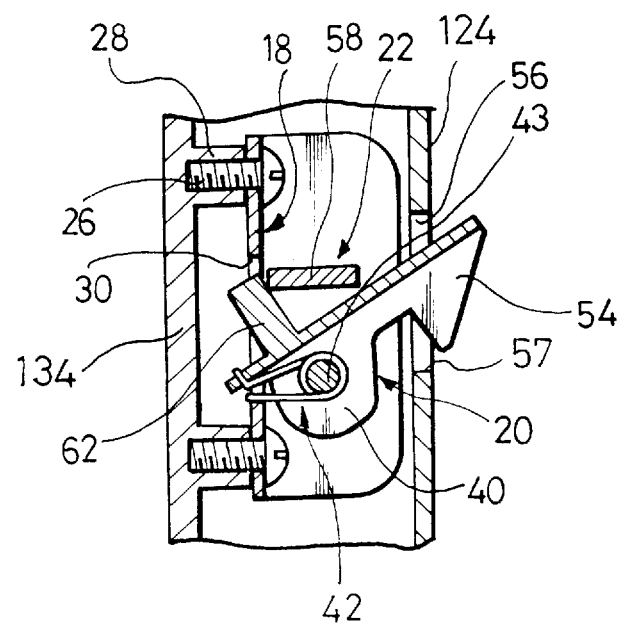
FIG. 6 is a sectional view showing the unlatched state of the locking mechanism in accordance with principles of the present invention.

Button mechanism 22 operates pivotable latching member 20, and includes planar part of lever 58 formed out of a rectangular shaped member in which groove 64 is formed to catch protrusion 62 of plane portion 36 of pivotable latching member 20. As may be seen in FIG. 2, button mechanism 22 also includes button 60 located at an opposite end from lever 58. Coil spring 66 biases button mechanism 22 and button 60 outwardly while flange 70 surrounding button 60 prevents button mechanism 22 from being ejected by coil spring 66 from case 203. Flange 70 is positioned just inside front cover 134, and since flange 70 is bigger than aperture 92, flange 70 succeeds in holding button mechanism 22 in place with button 60 positioned inside aperture 92, thus preventing button mechanism 22 from being ejected. Button mechanism 22 is assembled so that planar part of lever 58 passes through slot 68 formed on side wall 32 of supporting member 18, and so that groove 64 catches protrusion 62. Groove 64 is bounded by an edge 65 on the side of groove 64 furthest from button 60, and by inclined edge 63 on the side of groove 64 closest to button 60. When button mechanism 22 is outwardly retracted, edge 65 of groove 64 catches protrusion 62 of pivotable latching member 20. When button 60 is pressed, inclined edge 63 of groove 64 of lever 58 of button mechanism 22 rides along the circumferential exterior surface of vertically upright cylindrical protrusion 62 of pivotable latching member 20, with the resulting camming action causing the front portion of pivotable latching member 20 to rotate downwardly against the resilient force of elastic member 42. As best seen in FIG. 6, rotation against the bias of elastic member 42 causes hooks 52 and 54 in the rear of pivotable latching member 20 to rise from edge 57 of aperture 56 of first plate 124 of bottom plate assembly 120, thereby allowing front upper cover assembly 130 to be separated from bottom plate assembly 120. While button 60 is held in a depressed state relative to aperture 92, front upper cover assembly 130 can be removed from bottom plate assembly 120 by simultaneously pulling on front cover 134. This will cause guide pins 16 and 17 to withdraw from guide holes 12 and 14 respectively, thereby separating front upper cover assembly 130 from bottom plate assembly 120. Assembly of computer case 203 is achieved by first attaching the electronic computer components to bottom plate 122 of bottom plate assembly 120. Next, front upper cover assembly 130 is placed over bottom member 120 so that front cover 134 extends in front of first plate 124 and is exposed to the view of a user. Guide pins 16 and 17 are now aligned with guide holes 12 and 14 respectively, while pivotable latching member 20 is aligned with aperture 56. Front cover 134 and second plate 126 are squeezed together, thereby causing front cover 134 to move closer to first plate 124. As this occurs, guide pins 16 and 17 are inserted into guide holes 12 and 14 respectively while hooks 52 and 54 of pivotable latching member 20 rides over edge 57 of aperture 56 of first plate 124 of bottom member 120, thereby causing the rear portion of pivotable latching member 20 to rotate upward while the front portion of pivotable latching member 20 rotates downward, causing hooks 52 and 54 of pivotable latching member 20 to slide into aperture 56 and to engage with edge 57 of bottom member 120, thus automatically latching front upper cover assembly 130 to bottom member 120.

Figure 7:
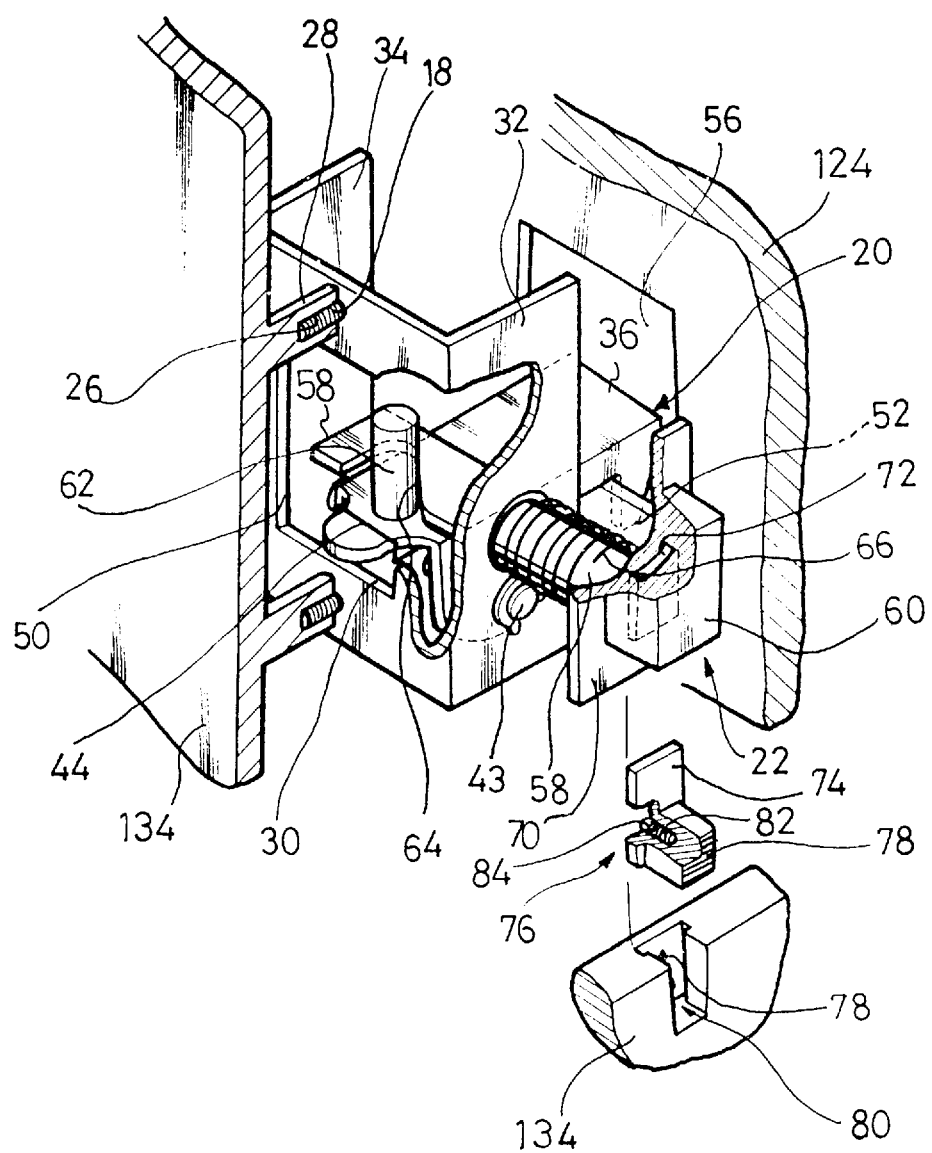
FIG. 7 is a partially exploded fragmentary sectional perspective view showing the assembly structure of the front and upper cover and the slidable detent mechanism constructed as first embodiment of the present invention.

FIG. 7 illustrates a first embodiment of this invention, showing a detent feature for button 60. The detent mechanism according to this embodiment is constructed with a monolithically integrated unit, called locking knob 76, slidably fitted to slide within groove 80 recessed within the exterior surface of front cover 134 of front upper cover assembly 130. Locking knob 76 can slide vertically along slide groove 80 of front cover 134 just beneath aperture 92, where button 60 protrudes. Locking knob 76 has a protrusion 74 on the upper side, and a gripping protrusion 78 on the lower side configured to be visually exposed to and manually engaged by one finger of a user. Protrusion 74 extends upward parallel to the direction of sliding of locking knob 76, while gripping protrusion 78 extends outward, parallel to the direction of travel of button mechanism 22. Inside gripping protrusion 78 is a ball 84 (e.g., a single ball bearing), and elastic member 82 to push ball 84 inside. Because ball 84 is always supported elastically on the inside of groove 78, ball 84 can when engaging button mechanism 22, prevent locking knob 76 from sliding downward inadvertently. Underneath the middle portion of button 60 is a hollow socket 72 which accommodates catching protrusion 74 when locking knob 76 is slid upwardly towards button 60. Accordingly, after assembly of computer case 203, if locking knob 76 is raised toward button 60, then catching protrusion 74 is inserted into socket 72, thereby preventing button 60 from being depressed inwardly relative to the side flange of front cover 134.

Figure 8:
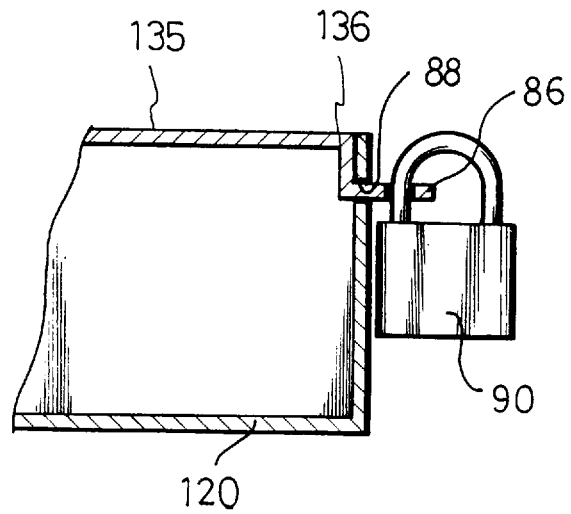
FIG. 8 is a sectional view illustrating the locked state of a security mechanism constructed as a second embodiment of the present invention.
Figure 9:
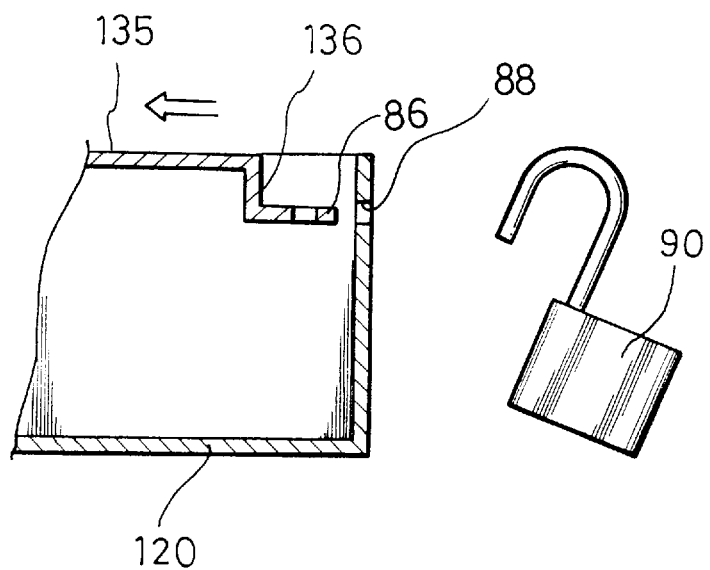
FIG. 9 is a sectional view illustrating the unlocked state of the security mechanism of the second embodiment of the present invention.

FIG. 8 and FIG. 9 portray the second embodiment showing a security mechanism that may be incorporated into an embodiment of the present invention. In the second embodiment, locking tab 86 protrudes rearward from rear flange 136 of front upper cover assembly 130. Aperture 88 is positioned on second plate 126 of bottom plate assembly 120, so that locking tab 86 can be inserted into aperture 88 during assembly. Aperture 87 located near the rearward extremity of locking tab 86, allows padlock 90 to attach to tab 86 after tab 86 has been inserted through aperture 88. Padlock 90 prevents the inadvertent withdrawal of tab 86 from aperture 88, thus reliably preventing the separation of front upper cover assembly 130 from bottom plate assembly 120.

When bottom plate assembly 120 and front upper cover assembly 130 are assembled as shown in FIG. 2, and there is no need to use easily misplaced removable fasteners such as screws, or tools, when assembling the present invention. The integration of locking mechanism 20 into the container formed by assembly of bottom plate 120 and upper cover 135, in conjunction with the front guide pin array 12, 16, the rear flange guide pin array 14, 17, and the security mechanism 86, 88, on 36 assures a heightened degree of integrity for the security of the closed container, as well as accurate alignment of the structural members of the container while closing the container and maintenance of the ease of opening the container for routine maintenance and insertion of additional circuit boards. Moreover, this integration assures convenience of the assembly of the container incorporating the latch into the interior of the container, during manufacture. Furthermore, the compact arrangement of the latch within supporting member 18 enables easy ad accurate installation of the latch into the case during assembly of the computer on a manufacturing assembly line. Therefore, the present invention enables quick and convenient assembly both on the factory assembly one and by a user and disassembly by a user and can increase assembly efficiency and improve productivity in the manufacturing process.

While the invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A personal computer with an easy assembly structure comprising:

a bottom plate accommodating mounting of components of said personal computer, said bottom plate having a bottom surface, first and second walls erected in spaced-apart relation respectively on front and rear sides;

a front upper cover assembly, inserted to slide onto said bottom plate, said front upper cover assembly comprising:

a front cover defining a front side of said personal computer, and an upper cover comprised of upper, left, and right lateral sides of said personal computer, and a rear flange extending around said upper, left, and right sides of said rear side of said computer; and a locking mechanism, mounted on said front upper cover assembly, comprising:

a pivotable latching member engaging an edge of an aperture in said first wall of said bottom plate, said pivotable latching member being supported by a U-shaped bracket having opposite first and second sidewalls separated by an intermediate front wall integrally joined to said first and second sidewalls and attached to an inside of said front cover, said first sidewall being perforated by a slot;

said pivotable latching member having opposite first and second flanges separated by an upper central web integrally joined to said first and second flanges, said first and said second flanges each having a distal end terminated by a hook extending away from said web and engaging said edge of said aperture in said bottom plate in a locked configuration, said web having a front end bearing a protrusion extending upwardly away from said flanges, said first and second flanges each having a front end coaxially and pivotally coupled between said sidewalls of said bracket to rotate around an axis generally between said protrusion and said hooks;

a button mechanism mounted within an interior formed between said bottom plate and said front upper cover assembly, said button mechanism having a coil spring biasing said button mechanism to protrude laterally outwardly beyond said first wall of said bottom plate and laterally outwardly beyond said front upper cover assembly, said button mechanism responding to manual manipulation of depression of said button mechanism toward said coil spring bias by forcing said pivotable latching member to rotate and to disengage from said edge of said aperture on said first wall, thereby allowing said front upper cover assembly to be separated from said bottom plate, wherein said push button mechanism is a monolithically integrated unit comprised of:

a push button at one end of the button mechanism; and a flat plate part fixed at a proximal end to said button and extending to an end opposite said push button, said flat plate part comprised of a groove bounded by a latching edge on a side of said groove opposite said push button and an inclined edge on a side of said groove closest to said button, said groove engaging a protrusion on said pivotable latching member, said inclined edge of said groove camming said protrusion on said pivotable latching member as said push button is pressed, and thereby causing said pivotable latching member to pivot against said spring bias;

a detent feature for said push button comprising:
   said push button protruding from said front cover assembly through a lateral side of said front cover;
   a socket on the underside of said push button;
   a slide groove on said lateral side of said front cover of said front upper cover assembly; and
   a locking knob slidably located in said slide groove, said locking knob comprised of:
      a protruding tab on one end of said locking knob that fits into said socket underneath said push button, thus preventing said push button, from being depressed, and
      a gripping protrusion located on an end of said locking knob opposite said protruding tab, said gripping protrusion containing a ball and an elastic member biasing said ball laterally inwardly against a surface of said groove, thus preventing inadvertent sliding of said locking knob, and thereby preventing inadvertent disengagement of said front cover assembly from said bottom plate.

2. A personal computer with an easy assembly structure, comprising:
   a bottom plate accommodating mounting of components of said personal computer, said bottom plate having a bottom surface, first and second walls erected in spaced-apart relation respectively on front and rear sides thereof;
   a front upper cover assembly, slidably inserted onto said bottom plate, said front upper cover assembly comprising:
      a front cover defining a front side of said personal computer, and
      an upper cover comprised of upper, left, and right lateral sides of said personal computer, and a rear flange extending along said upper, left, and right lateral sides of said cover; and
   a locking mechanism, mounted on said front upper cover assembly, comprising:
      a pivotable latching member mounted on said front upper cover assembly and engaging an edge of an aperture in said fist wall of said bottom plate, thereby locking said bottom plate and said front upper cover assembly against relative movement,
      a button mechanism mounted on a first one of said lateral sides and reciprocating along a first axis parallel with said front cover under influence of manual manipulation between a rest state while free of said influence and a depressed state of being depressed while under said influence and positioned nearer to a second and opposite one of said lateral sides; and
      said pivotable latching member releasing said edge, wherein said front upper cover assembly in response to manually applied force, can be moved relative to said bottom plate along a second axis while a user holds said button mechanism in said second state and simultaneously pulls said front upper cover assembly along said second axis.

3. The personal computer of claim 2, further comprised of said first axis defining a first horizontal direction and said second axis defining a second horizontal direction perpendicular to said first direction.

4. The personal computer of claim 2, further comprised of said pivotable latching member rotating within a plane perpendicular to said first axis as said button mechanism travels between said first state and said second state.

5. The personal computer of claim 3, further comprised of said pivotable latching member rotating within a plane perpendicular to said first axis as said button mechanism travels between said first state and said second state.

6. A personal computer with an easy assembly structure, comprising:
   a bottom plate accommodating mounting of components of said personal computer, said bottom plate having a bottom surface, first and second walls erected in spaced-apart relation respectively on front and rear sides thereof;
   a front upper cover assembly, slidably inserted onto said bottom plate, said front upper cover assembly comprising:
      a front cover defining a front side of said personal computer, said front cover having a left side edge and a right side edge, and
      an upper cover comprised of upper, left, and right lateral sides of said personal computer, and a rear flange extending along said upper, left, and right lateral sides of said upper cover; and
   a plurality of locking mechanisms, mounted on said front upper cover assembly, each of said locking mechanisms comprising:
      a pivotable latching member mounted to said front upper cover assembly and engaging an edge of an aperture in said first wall of said bottom plate, thereby locking said front upper cover assembly against separation from said bottom plate,
      a button mechanism mounted on a unique one of said lateral sides of said front cover of said front upper cover assembly and reciprocating along a first axis parallel with said front cover under influence of manual manipulation, said button mechanism having a coil spring biasing each said button mechanism during a first rest state laterally outwardly while free of said influence, said button mechanism responding to manual manipulation with depression of said button mechanism against said coil spring bias, said button mechanism travelling along said first axis toward an opposite one of said lateral sides to a second state, said button mechanism forcing said pivotable latching member to rotate and to disengage from said edge of said aperture on said first wall and allowing said front upper cover assembly to be separated from said bottom plate, and
      said bottom plate and said front upper cover assembly in response to manually applied force, travelling in opposite directions along a second axis while a user holds said button mechanism in said second state and simultaneously pulls said front upper cover assembly along sad second axis.

7. The personal computer of claim 6, further comprised of said first axis defining a first horizontal direction and said second axis defining a second horizontal direction perpendicular to said first direction.

8. The personal computer of claim 6, further comprised of said pivotable latching member rotating within a plane perpendicular to said first axis as said button mechanism travels between said first state and said second state.

9. The personal computer of claim 7, further comprised of said pivotable latching member rotating within a plane perpendicular to said first axis as said button mechanism travels between said first state and said second state.

10. A personal computer with an easy assembly structure, comprising:

a bottom plate accommodating mounting of components of said personal computer, said bottom plate having a bottom surface, first and second walls erected in spaced-apart relation respectively on front and rear sides thereof;

a front upper cover assembly, slidably inserted onto said bottom plate, said front upper cover assembly comprising:

a front cover defining a front side of said personal computer, and an upper cover comprised of upper, left, and right lateral sides of said personal computer, and a rear flange extending along said upper, left, and right lateral sides of said cover; and a locking mechanism, mounted on said front upper cover assembly, comprising:

a pivotable latching member mounted on said front upper cover assembly and engaging an edge of an aperture in said first wall of said bottom plate, thereby locking said bottom plate and said front upper cover assembly against relative movement, a button mechanism mounted on a first one of said lateral sides and reciprocating along a first axis parallel with said front cover under influence of manual manipulation between a rest state while free of said influence and a depressed state of being depressed while under said influence and positioned nearer to a second and opposite one of said lateral sides; and said pivotable latching member releasing said edge, and with said bottom plate and said front upper cover assembly travelling in response to manually applied force, in opposite directions along a second axis while a user holds said button mechanism in said second state and simultaneously pulls said front upper cover assembly along said second axis.

* * * * *